(12) United States Patent
Langberg et al.

(10) Patent No.: US 6,421,377 B1
(45) Date of Patent: Jul. 16, 2002

(54) SYSTEM AND METHOD FOR ECHO CANCELLATION OVER ASYMMETRIC SPECTRA

(75) Inventors: Ehud Langberg, Wayside; Xueming Lin, Eatontown; Weimin Liu, Aberdeen; Wenye Yang, Ocean, all of NJ (US)

(73) Assignee: GlobespanVirata, Inc., Red Bank, NJ (US)

(*) Notice: Subject to any disclaimer, the term of this patent is extended or adjusted under 35 U.S.C. 154(b) by 0 days.

(21) Appl. No.: 09/164,552

(22) Filed: Oct. 1, 1998

Related U.S. Application Data (60) Provisional application No. 60/085,297, filed on May 13, 1998.

(51) Int. Cl.[7] .............................. H04B 1/38; H04B 3/20; H04L 5/16
(52) U.S. Cl. ...................... 375/222; 375/350; 370/286; 370/290; 379/406.01; 379/406.08
(58) Field of Search ...................... 375/350, 285, 375/284, 232, 260, 222, 346; 370/286, 290, 291; 379/406, 410, 411, 406.01, 406.05, 406.08, 406.09; 455/570; 708/322, 323, 313

(56) References Cited

U.S. PATENT DOCUMENTS

| | | | | |
|---|---|---|---|---|
| 5,203,335 A | * | 4/1993 | Noujaim et al. | 600/447 |
| 5,317,596 A | | 5/1994 | Ho et al. | 375/14 |
| 5,566,167 A | * | 10/1996 | Duttweiler | 370/290 |
| 5,633,863 A | | 5/1997 | Gysel et al. | 370/290 |
| 5,740,242 A | | 4/1998 | Hayashi | 379/411 |
| 5,917,809 A | * | 6/1999 | Ribner et al. | 370/286 |

* cited by examiner

Primary Examiner—Betsy L. Deppe
(74) Attorney, Agent, or Firm—Thomas, Kayden, Horstemeyer & Risley (57) ABSTRACT

The present invention generally relates to echo cancellation over an asymmetric transmission and receiving spectra. An apparatus is provided having a transmit path and a receive path, with an adaptive echo canceler disposed therebetween, for communicating data within a first bandwidth and a second bandwidth respectively. A first decimator is disposed between the transmit path and the echo canceler circuit and filters an incoming signal having a first sampling rate and emits a signal output at a second, reduced sampling rate. A second decimator is disposed along said receive path and filters an incoming signal and emits a signal output at a reduced sampling rate. An adder is disposed to subtract the output of the adaptive echo canceler from output of the second decimator to generate a received signal that is substantially free of echo.

23 Claims, 7 Drawing Sheets

SYSTEM AND METHOD FOR ECHO CANCELLATION OVER ASYMMETRIC SPECTRA

CROSS-REFERENCE TO RELATED APPLICATIONS

This application claims the benefit of U.S. Provisional Application Ser. No. 60/085,297, filed May 13, 1998, and entitled Echo Cancellation Over Asymmetric Spectra.

BACKGROUND OF THE INVENTION

1. Field of the Invention

The present invention generally relates to echo cancellation for data transmission, and more particularly to a system and method for echo cancellation in an environment having an asymmetric spectrum, such as asymmetric digital subscriber line (ADSL), using either single-carrier or multi-tone modulation.

2. Discussion of the Related Art

Full-duplex data transmission is the transmission of data in opposite directions simultaneously. When full-duplex transmission uses overlapping frequency bands, echo is the undesired leakage of a transmitted signal into the co-located receiver, superimposed upon and thus interfering with the intended reception. As an example, in a telephone network, one type of echo occurs when a customer's transmitted signal leaks through the hybrid circuit back into that customer's receiver, interfering with the transmitted signal from another customer.

In a communication over wire, such as ADSL (asymmetric digital subscriber line), the data traveling in the two opposite directions use asymmetric but sometimes overlapping signal bandwidth. Even in cases where the in-band spectra in the two opposite directions do not overlap, the inevitable transition bands may still cause in-band echoes. An echo cancellation technique must then be employed to separate the upstream and downstream signals in the overlapping spectrum. The performance of an echo canceler is of essence since in many cases the echo is much stronger than the intended signal.

Figure 1:
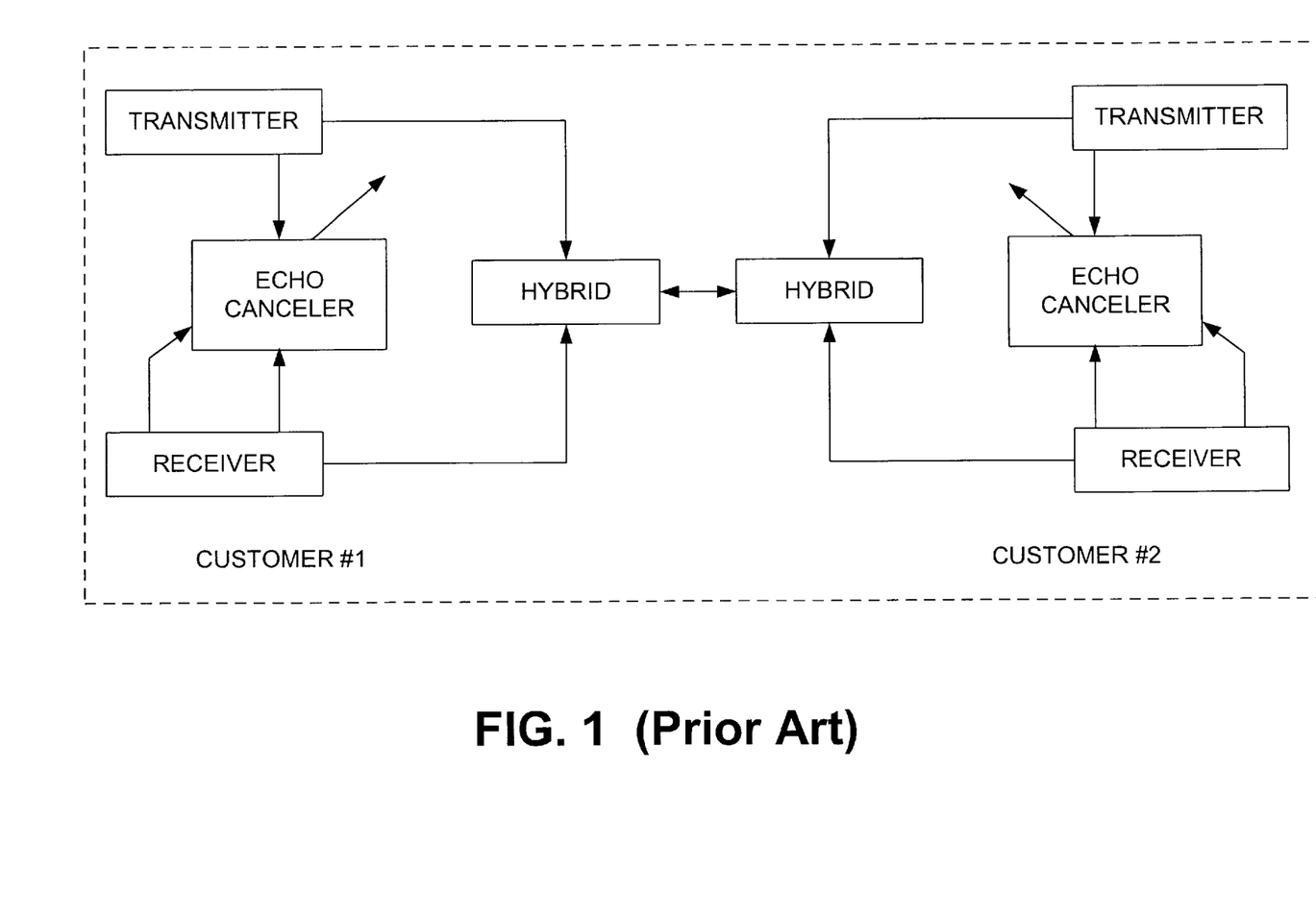
FIG. 1 is a block diagram of a two-ended transmitter/receiver system.

FIG. 1 is a block diagram of a prior art system, wherein the transmitted signals in the two opposite directions are mixed and separated at the hybrid connectors. Echo occurs primarily because of the impedance mismatch between the hybrid connector and the two-wire phone line. An echo canceler operates by first estimating the parameters of the echo path, and then convolving the estimate with the transmitted data, thus emulating the echo. This emulated echo (also referred to herein as echo replica) is then subtracted from the received signal, which ideally results in an echo-free transmission.

Because the impedance of the transmission lines is time varying as well as line dependent, the echo canceler must be adaptive—it must learn the echo characteristics and track time-varying changes. The echo canceler can be made adaptive as follows: After estimating the echo parameters, emulating the echo, and subtracting it from the received signal, the remaining signal (which contains some residual echo) is fed back and used to update the estimated set of echo parameters. This feedback loop allows the echo canceler to converge to a close approximation of the echo parameters.

Echo cancellation may be accomplished either in the time domain or in the frequency domain. In time-domain echo cancellation, echo parameters are derived by estimating the echo path impulse response, and echo emulation involves a time-domain convolution. In frequency-domain echo cancellation, the echo parameters are obtained by estimating the frequency response of the echo path rather than the impulse response of the echo path. Echo emulation and adaptive update can then take place in the frequency domain, using the estimate of the frequency response of the echo channel.

Multicarrier modulation is a means of transmitting data by first grouping the binary digital data to be transmitted into sub-blocks. The sub-blocks are then further grouped into fixed-length blocks. As an example, each sub-block may contain one to eight bits, and 100 sub-blocks will form a block. For transmission across the communication channel, a set of carrier signals is used whose frequencies lie at evenly spaced values across the usable frequency band. This set of carrier signals is equal in number to the number of sub-blocks within a block. Continuing the above example, with a useful bandwidth of 1.0 MHz, 100 carrier signals would be used at multiples of 10 kHz. The bits within each sub-block are then used to modulate the corresponding carrier signal. The set of modulated carriers are then added together, and the resultant signal is transmitted across the channel.

Most existing time-domain echo cancelers use the tapped-delay line structure (also known as an FIR filter) to model the echo path and replicate the echo. However, at high sampling rates, the FIR filter can be several hundred taps long in order to provide enough coverage for the entire echo path, and the computational complexity is high. A prior-art invention specifically related to discrete multi-tone (DMT) modulation alleviates this computational complexity by performing the bulk of echo emulation in the frequency-domain, but it requires a tangled receiver structure in which equalization is placed prior to echo cancellation, consequently a complicated synchronization procedure, and a large amount of memory.

Accordingly, an alternative solution that overcomes the shortcomings of the prior art is desired.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to method and apparatus for echo cancellation over an asymmetric transmission and receiving spectra, specifically when the transmitted spectrum is greater than that of reception. In essence, the system implements identical low-pass decimation circuits between the transmit path and an echo canceler and the receive path and the echo canceler, thereby reducing the sampling rate and the number of echo canceler coefficients without affecting coverage. The echo canceler may be implemented in accordance with conventional echo cancellation techniques. Advantageously the decimation circuits significantly reduce the memory requirement and thus computation of the echo canceler. Since the inventive method and apparatus operate strictly in the time domain, essentially no synchronization is required, and they can be readily applied to both single-carrier and multi-carrier transmission.

In accordance with one aspect of the invention, an apparatus is provided having a transmit path for communicating data within a first bandwidth, a receive path for communicating data within a second bandwidth that is smaller than said first bandwidth, and an adaptive echo canceler disposed between the transmit path and the receive path. A first decimator is disposed between the transmit path and the echo canceler circuit, whereby the first decimator filters an incoming signal having a first sampling rate on said transmit path and emits a signal output at a second, reduced sampling rate. A second decimator, identical to said first decimator, is disposed along said receive path whereby said second decimator filters an incoming signal having a sampling rate approximately equal to the first sampling rate, to emit a signal output at a reduced sampling rate, approximately equal to the second sampling rate. Finally, an adder is disposed to subtract the output of the adaptive echo canceler from output of the second decimator to generate a received signal that is substantially free of echo.

In accordance with the preferred embodiment the first and second decimators are identical in function and operation. Consequently the required coverage of the echo canceler, which translates directly into the number of coefficients, needs not to be extended, in spite of the effective insertion of the second decimator into the echo path. Preferably, each operates to decimate an input signal by a ratio of four to one for T1.413/G.dmt, or two to one for UAWG/G.lite, all of which discrete multi-tone (DMT) ADSL standards or pending standards. In the preferred embodiment, the transmit path includes a signal having a sampling rate of 2,208 kilo-samples per second and the receive path includes a signal having a sample rate of 552 kilo-samples per second.

In accordance with another aspect of the invention, a method is provided for echo cancellation in a system having a transmit bandwidth that is larger than the receive bandwidth. In accordance with this inventive aspect, the method includes the steps of decimating a transmission reference signal and inputting the decimated signal into an echo canceler, and decimating a received signal. It should be emphasized here that decimation, or bandwidth reduction, of the received signal can alternatively be implemented in the analog domain. Then, an output of the echo canceler is subtracted from an output of the decimated received signal. Finally, the echo residual, i.e., the result of the subtraction, is used to adapt the echo canceler.

BRIEF DESCRIPTION OF THE DRAWINGS:

The accompanying drawings incorporated in and forming a part of the specification, illustrate several aspects of the present invention, and together with the description serve to explain the principles of the invention. In the drawings.

DETAILED DESCRIPTION OF PREFERRED EMBODIMENT

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention.

Figure 2A:
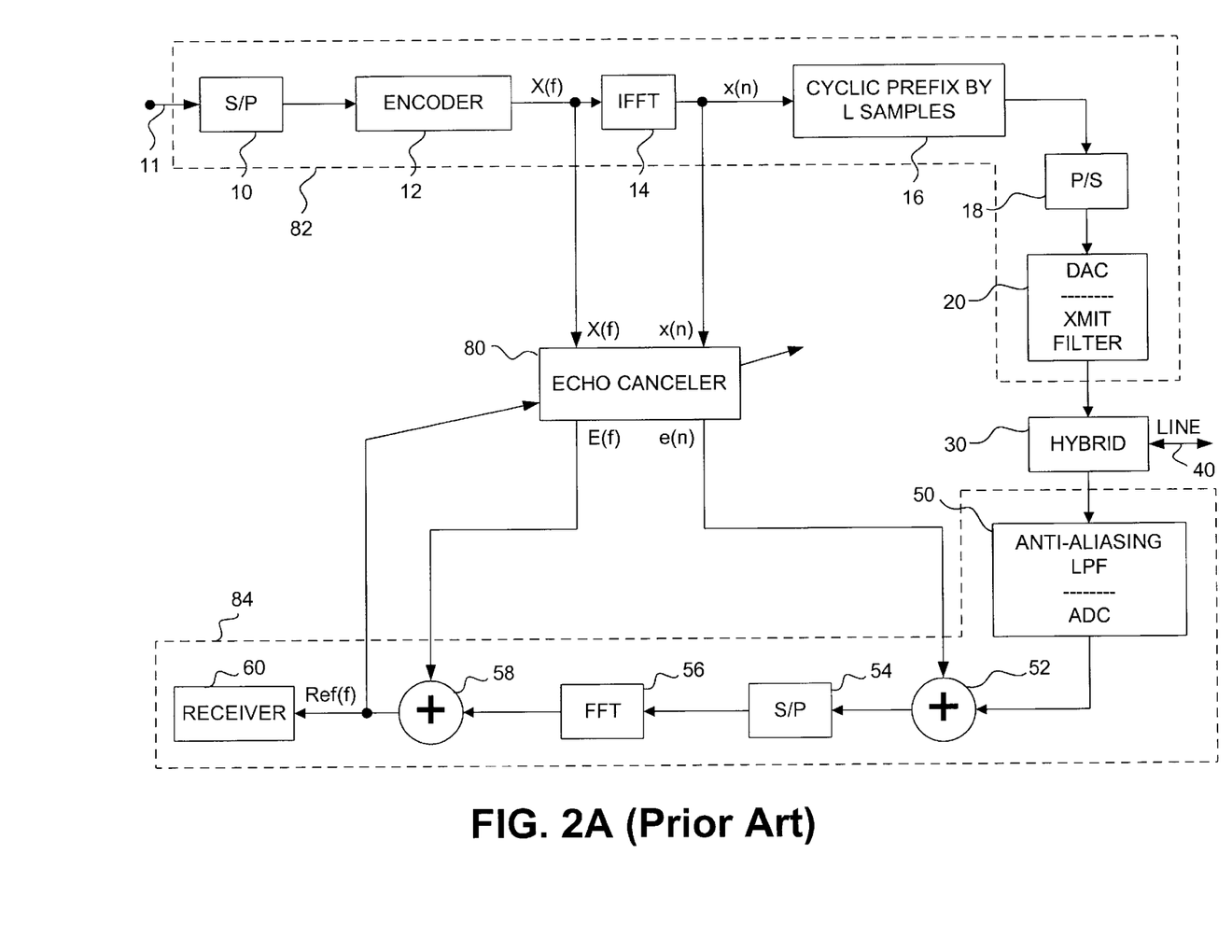
FIG. 2A is a block diagram of a hybrid time and frequency domain echo canceler for a DMT system, as is known in the prior art.

Turning now to the drawings, FIG. 2A shows a multicarrier transceiver system including an echo canceler 80, as is known in the prior art. This figure is included to more particularly illustrate the components of an echo cancellation system in a transmit portion 82 and receive portion 84 of the multicarrier transceiver system, and to show how an echo canceler fits into such a system.

In operation, data is transmitted on a block-by-block basis. While one block is clocked serially to the line, another is readied for transmission. The steps for generating one block of data are summarized as follows: The serial-to-parallel (S/P) converter 10, in conjunction with the encoder 12, converts a stream of binary data input at 11 into N sub-blocks, each of which comprises a variable number of binary bits. The encoder 12 then converts the binary data in each sub-block into a two-dimensional vector of integers. This can be considered to be a vector of complex integers, where one dimension can be taken as the real part and the other as the imaginary part. The resultant signal X(f) is then an NX1 vector whose elements are complex integers. Each of the N complex integers is modulated by N carriers at evenly spaced frequencies, using an IFFT 14 that converts the block of N "frequency-domain" complex values X(f) into a block of N real, "time-domain" samples x(n).

The Cyclic Prefix block 16 copies the last L samples of the NX1 real vector, called the cyclic prefix, and prepends them to the beginning of the block, in order to eliminate inter-block interference in the far-end receiver. The resultant (N+L)X1 vector is the signal to be transmitted.

The (N+L)X1 vector is converted by a parallel-to-serial converter (P/S) 18 into a sequence of time-domain signals which are then passed successively through a digital-to-analog converter (DAC) and transmit filter 20, a hybrid line interface 30, and then to the line 40. This concludes the transmit process.

The echo canceler 80 receives a frequency-domain transmit block X(f), a time-domain transmit block x(n), and an echo-free receive block Ref(f), and processes these inputs to emulate and produce an echo component of the transmitted signal which leaks to the received signal. The emulated signal includes a time-domain echo e(n) part and a frequency-domain echo E(f) part.

The received signal comprises the far-end transmission plus noise, as well as echo leakage from the near-end transmitter. It is processed as follows: The time-domain signal received from the line 40 is passed through a low-pass anti-aliasing filter an analog-to-digital converter (ADC) 50. After the adder 52 subtracts the time-domain portion of the echo, e(n), the output is converted by a serial-to-parallel (S/P) converter 54 into a block of N real-valued time-domain samples.

The resultant signal is then passed through an FFT 56 to produce a block of N complex-valued "frequency-domain"

samples. The frequency-domain portion of the echo E(f) is then subtracted by adder 58, to produce an (ideally) echo-free receive block Ref(f). The echo-free receive block is then passed to the rest of the receiver 60, as well as being returned to the echo canceler 80 for adaptive purposes.

DMT is a form of multicarrier modulation that is implemented with digital signal processing, where an IFFT/FFT pair is used as modulation/demodulation vectors.

In general, an echo channel is formed by multiplying together the responses of the DAC, the transmit filter, the hybrid, the anti-aliasing filter, and the ADC. The DAC converts the sequence x(n) to an impulse train multiplied by a continuous time function x(t), and convolves this with the impulse response of a zero-order hold (ZOH). In the frequency-domain, this corresponds to replicating the spectrum of X(f) at multiples of the sampling rate 1/T (denoted as X sub p(f)), multiplied by one copy of a sinc function.

Ideally, the transmit, or reconstruction filter, T(f), should cut off at around ½T. Otherwise, there are frequency components outside this bandwidth, and the echo canceler must cancel these components as well. We denote the hybrid frequency-domain response by H(f). The anti-aliasing filter, A(f), ideally cuts off at ½T.

The ADC is a sample and hold, so that the spectra are now replicated at multiples of the sampling rate 1/T', and multiplied by a sinc. If the anti-aliasing filter is not ideal, then aliasing occurs, and these effects must be modeled by the echo canceler.

A more detailed discussion of the structure and operation of FIG. 2A is provided in U.S. Pat. No 5,317,596, which is hereby incorporated by reference.

Figure 2B:
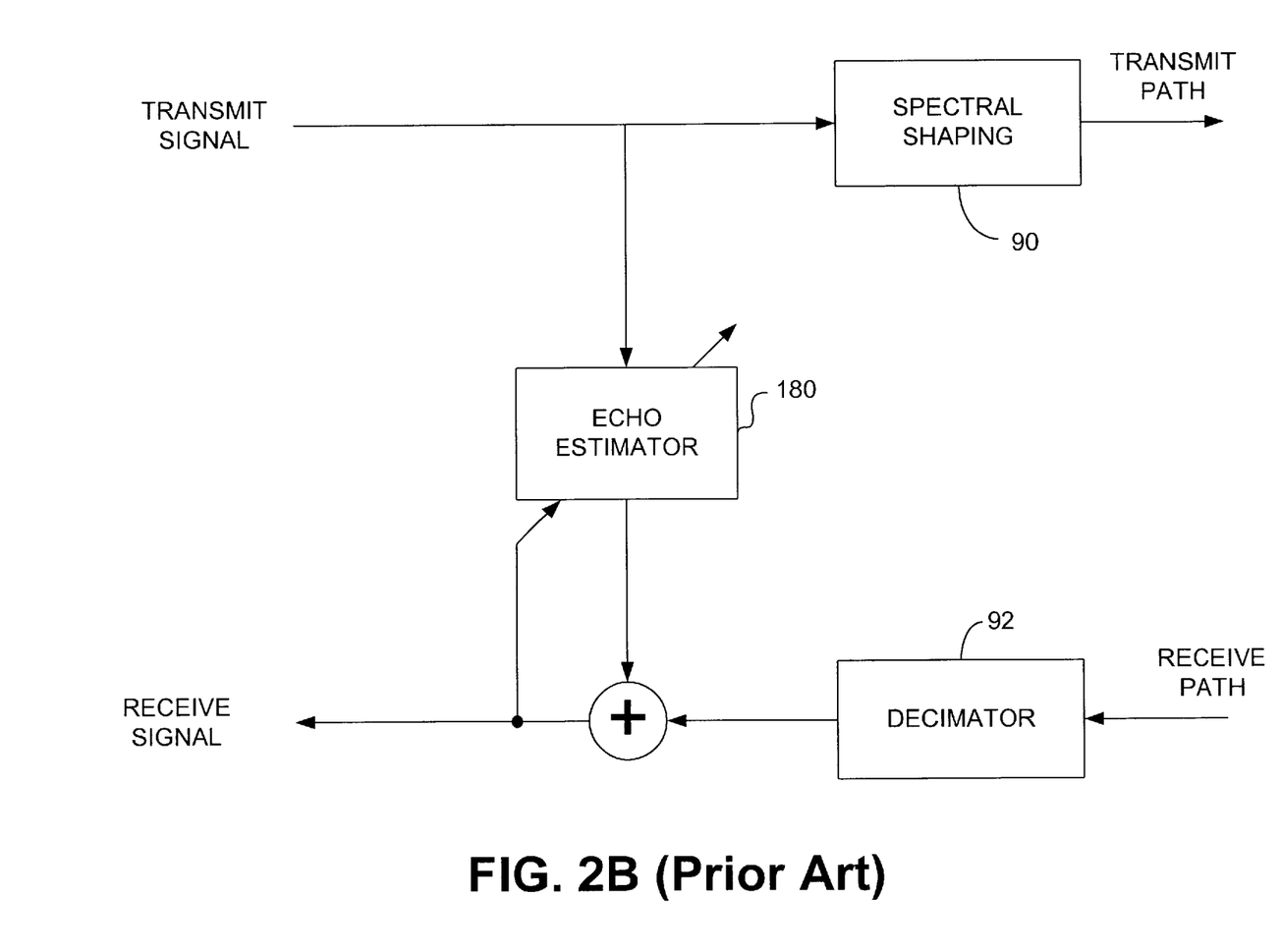
FIG. 2B a block diagram of a conventional time-domain echo cancellation system.
Figure 3:
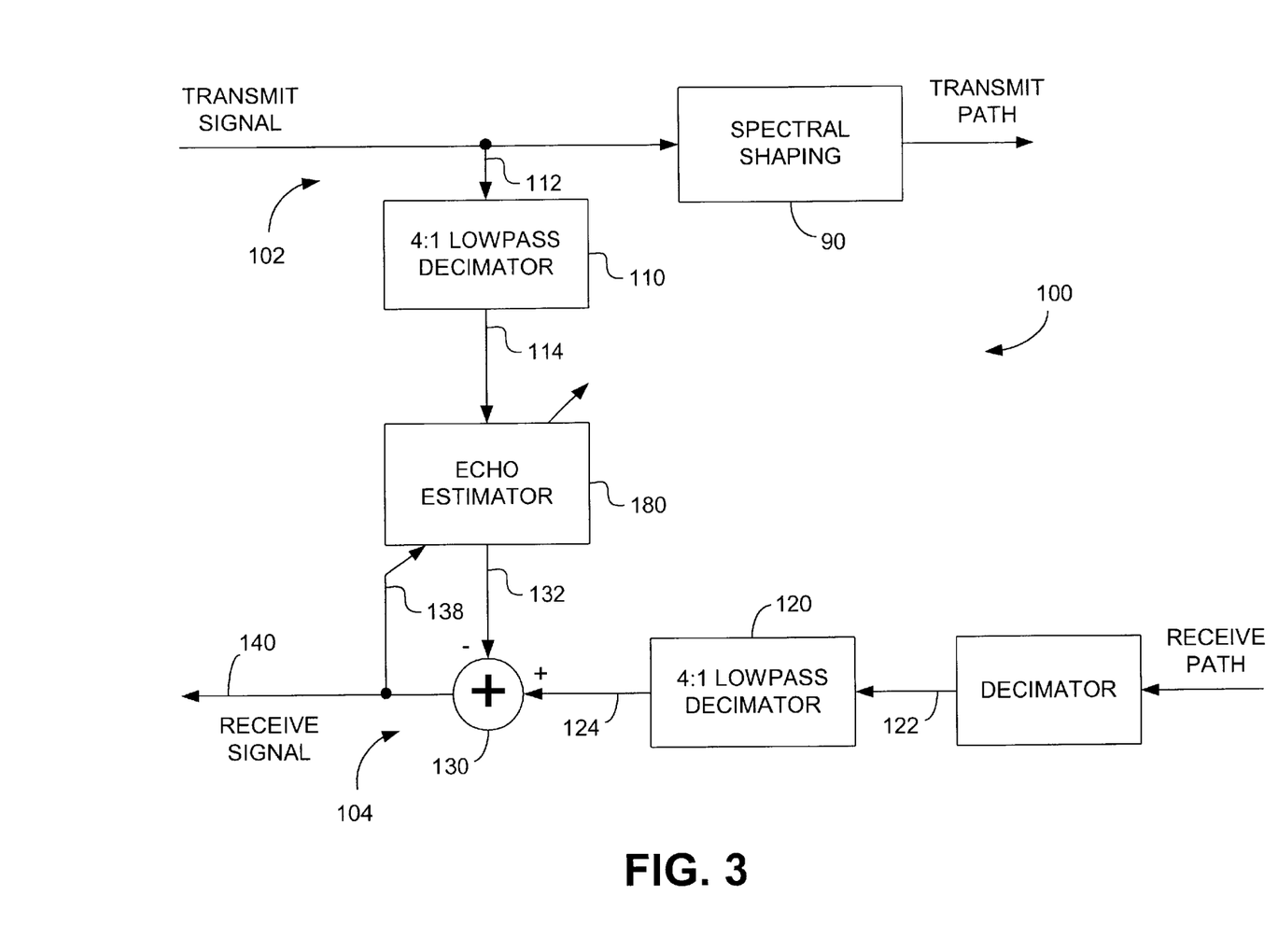
FIG. 3 is a block diagram of an echo cancellation system constructed in accordance with the present invention.

FIG. 2B illustrates a block diagram of the conventional time-domain echo cancellation system. The discussion of this conventional approach helps emphasize the advancement of the present invention as illustrated in FIG. 3. The transmit path is illustrated with a block labeled as "Spectral Shaping" 90. The function of this block is, in part, embedded in the transmit filter block 20 of FIG. 2A, and is well known in the art. Similarly, the receive path is illustrated with a block labeled "Decimator" 92. The function of this block is, in part, embedded in the anti-aliasing, low-pass filter block 50 of FIG. 2A, and is also well known in the art.

In a system having a bandwidth of the transmit path of approximately 1.104 megahertz (DC to 1.104 megahertz), the signal of the transmit path may be sampled at, for example, the Nyquist rate of 2.208 mega samples per second, or faster. As is known, the received signal in the receive path is sampled at some rate (at least 276 kilo samples per second), to be consistent with the receiving bandwidth of 138 kilohertz. Unfortunately, the relatively high sample rate in the transmitting path requires a large amount of taps (more than 300 for ADSL) and memory for the echo canceler 80. It also requires an exceptionally large number of computations. This memory/computation requirement has been a prohibitive factor in prior art systems, straining both hardware resources and power consumption.

FIG. 3 is a block diagram illustrating the advancement of the present invention. In this regard, an apparatus 100 is provided having a transmit path 102 for communicating data within a first bandwidth, a receive path 104 for communicating data within a second bandwidth, and an adaptive echo canceler 180 disposed between the transmit path 102 and the receive path 104. A first decimator 110 is disposed between the transmit path 102 and the echo canceler 180, whereby the first decimator 110 filters an incoming signal 112 having a first sampling rate on said transmit path 102 and emits a signal output 114 at a second, reduced sampling rate. A second decimator 120, preferably identical to said first decimator 110, is disposed along said receive 104 path whereby said second decimator 120 filters an incoming 122 signal having a sampling rate approximately equal to the first sampling rate, to emit a signal output 124 at a reduced sampling rate, approximately equal to the second sampling rate. Finally, an adder 130 is disposed to subtract the output of the adaptive echo canceler from the output of the second decimator to generate a received signal 140 that is substantially free of echo.

More specifically, DMT transmissions occur over an asymmetric spectra, wherein the transmit path in the central office (CO) equipment communicates within a bandwidth of approximately 1.104 megahertz (DC to 1.104 megahertz), whereas the received path communicates within a bandwidth of approximately 138 kilohertz (DC to 138 kilohertz). At this lower receive bandwidth, the receive path may sample the received signal at a much lower sample rate of 276 kilo samples per second. Preferably, however, the received signal is oversampled by two times, at a rate of 552 kilo samples per second, allowing the receiver to benefit from fractionally spaced equalization.

Thus, and in accordance with the preferred embodiment, the receive signal is decimated at a ratio of four to one by decimator 120. Therefore, a receive signal of 2.208 mega samples per second is decimated to a rate of 552 kilo samples per second. A similar decimator circuit 110 is disposed between the transmit path 102 and the echo canceler 180 to decimate the transmit signal from 2.208 mega samples per second to 552 kilo samples per second at output 114. As will be further described below, this allows the echo canceler 180 to operate and generate an output 132 at the same sample rate as the sample rate on the path 124, within the receiver path 104. Thus the number of taps in the echo canceler is reduced to one quarter of the original, reducing memory and computation requirements drastically while maintaining the same coverage. Adder 130 can readily subtract successive samples on these two signal paths 132 and 124.

In accordance with the preferred embodiment the first and second decimators 110, 120 are identical in function and operation. This identity allows the canceler to maintain the original coverage that would otherwise need to be extended in order to cover the decimation filter 120 which is now in the echo path. Preferably, each operates to decimate an input signal by a ratio of four to one for T1.413 or G.dmt DMT ADSL. In the preferred embodiment, the transmit path includes a signal having a sampling rate of 2.208 megasamples per second and the receive path includes a signal having a sample rate of 552 kilo-samples per second.

To avoid spectral aliasing, which degrades the echo canceler and receiver performance, the decimator in the preferred embodiment is implemented as a decimation FIR (finite impulse response) low pass filter (instead of simply dropping three out of every four samples). Although the operation of the apparatus 100 is preferably performed within a digital signal processor (DSP), there are conventional representations that are used and known by persons skilled in the art to represent certain functional operations. In this regard, reference is made to FIG. 4, which is a block diagram illustrating the general structure of the decimator circuits 110 and 120. The input signal is delivered to the decimator 120 at 202, and is passed through a series of delay elements 210, 212, and 214. The figure has been abbreviated, but in the preferred embodiment there are a total of 59 delay elements. A total of sixty taps, 220, 222, 224, 226, are interposed between each of the delay elements 210, 212, 214, which "tap" the intermediate signals. Each tap is multiplied by a coefficient value, denoted at $C_0$, $C_1$, $C_2$, ... $C_{59}$. The outputs of the various taps 220, 222, 224, 226 are summed by a summer circuit 230, and the summation is output from the decimator circuit.

Figure 4:
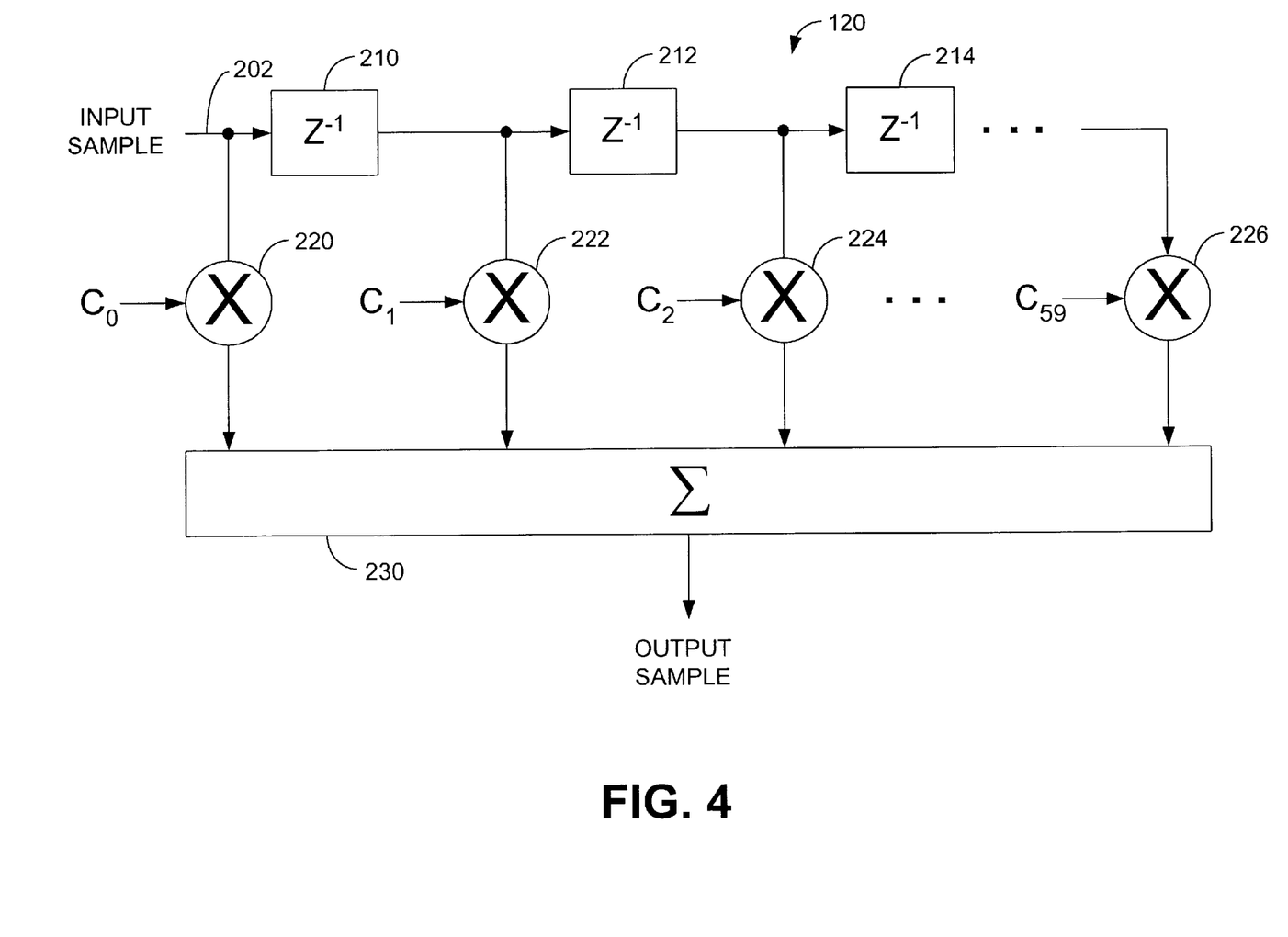
FIG. 4 is a block diagram illustrating the structure of the decimation filters shown in FIG. 3.
Figure 7:
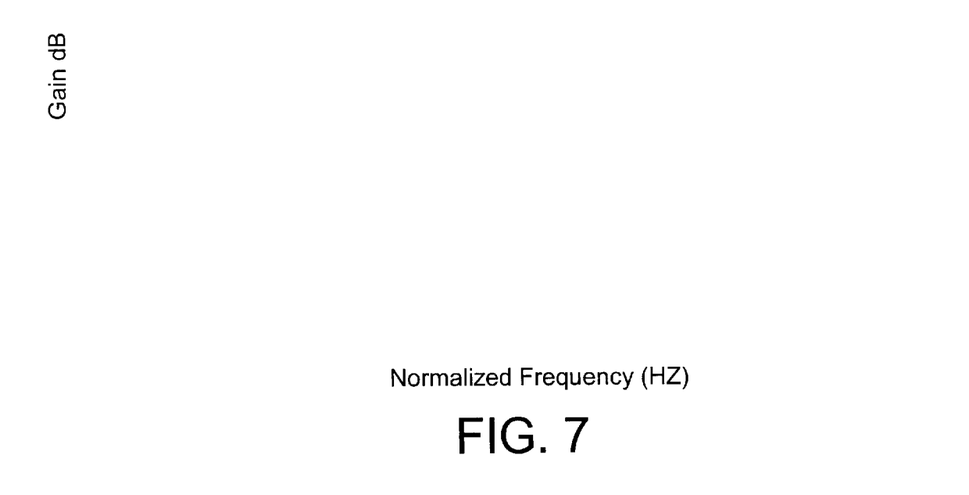
FIG. 7 is a graph illustrating the frequency response of the decimation filter of FIG. 4.

FIG. 7 is a graph illustrating the frequency response of the decimator circuit of FIG. 4. As illustrated, the filter has a substantially flat response from zero (DC) to approximately 138 kilohertz. It further provides a 100+ dB suppression beyond 276 kilohertz—i.e., the input signal bandwidth of 1,104 kilohertz is reduced to 276 kilohertz at the output. The frequency response from 138 kilohertz to 276 kilohertz is relatively unconstrained, except that it should not have deep nulls, allowing for use of a relatively short FIR filter.

Figure 6:
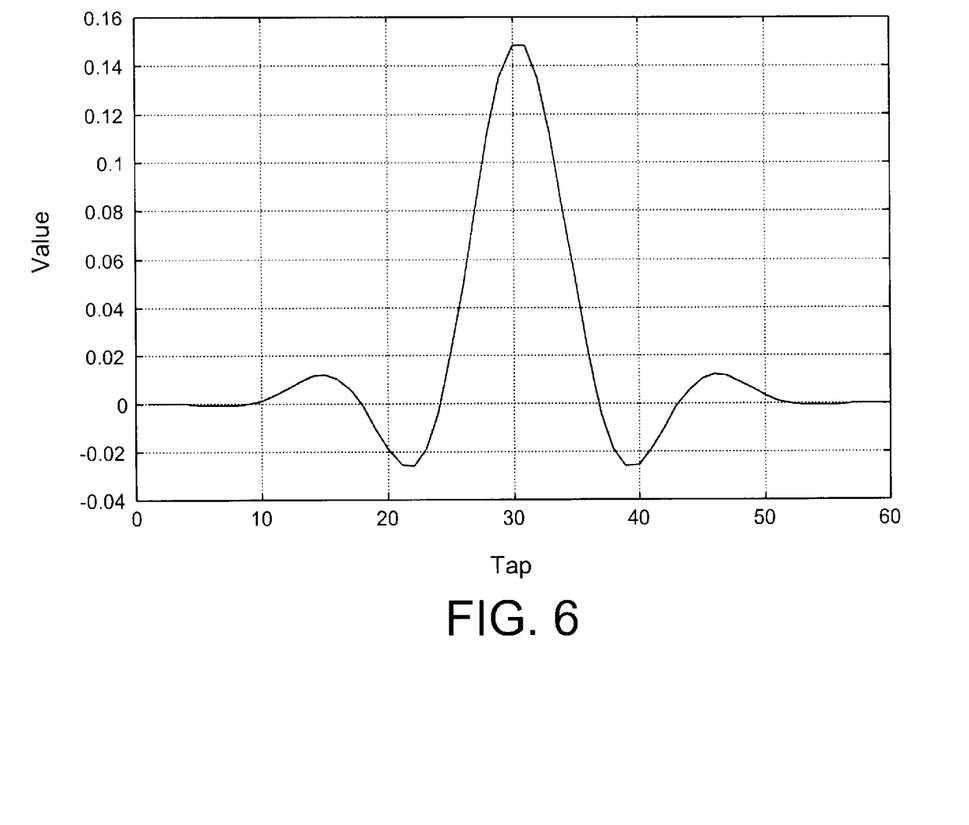
FIG. 6 is a graph showing the coefficients for the filter of FIG. 4.

A person ordinarily skilled in the art can readily convert such a requirement on the frequency response of the decimation filter into coefficient values, usually using a filter design software. The linear-phase coefficients $C_0$, $C_1$, $C_2$, ... $C_{59}$ used in the preferred embodiment are shown in FIG. 6.

Returning to the decimator circuit of FIG. 4, in each output sampling period (at 552,000 samples per second), one output sample x[n] is generated according to:

$$x[n] = \sum_{k=0}^{59} s[4n-k]C_k, \quad \text{Equation 1}$$

where $C_k$ are the filter coefficients, and s[n] is the input signal sampled at 2,208,000 samples per second.

Figure 5:
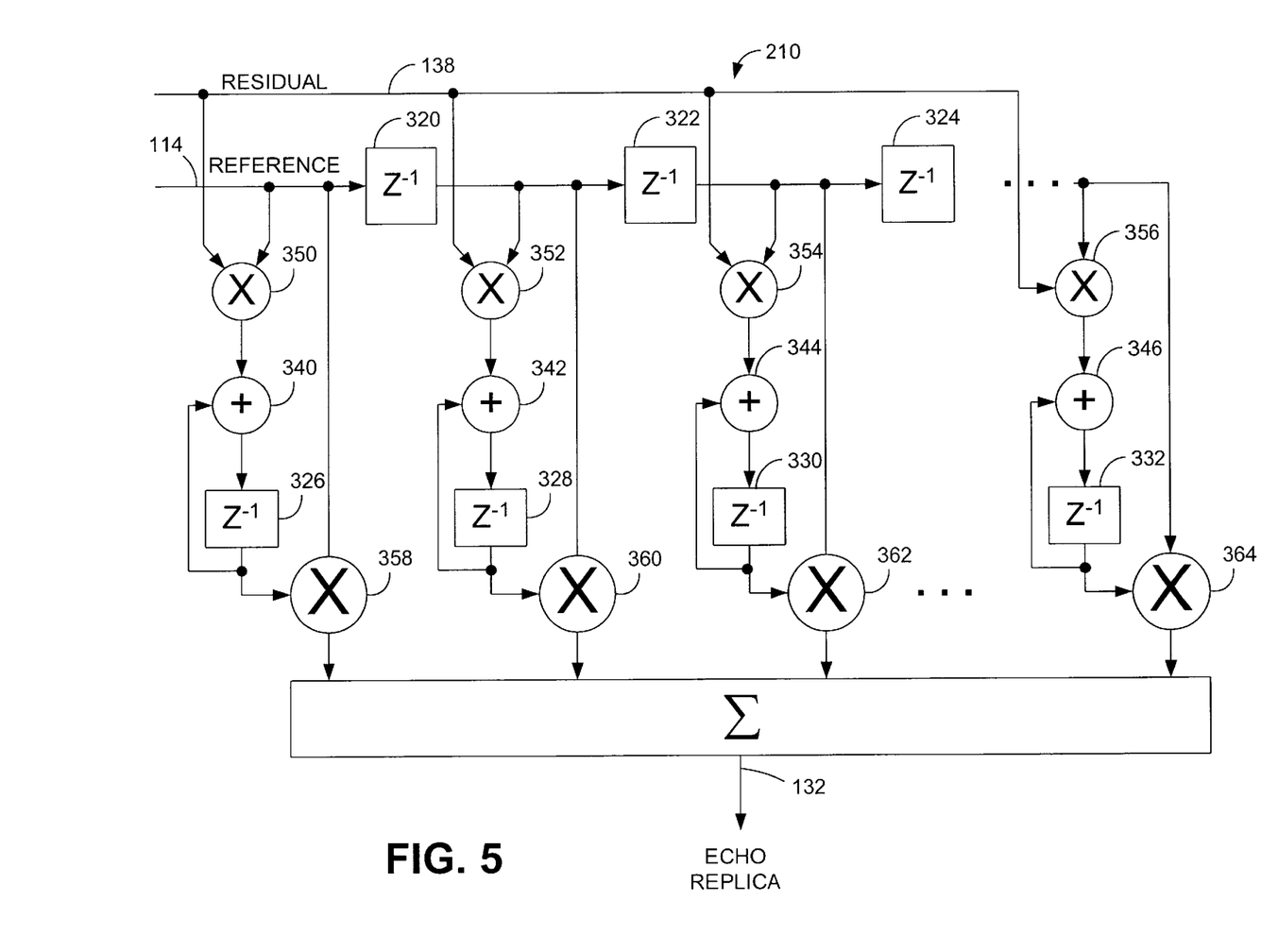
FIG. 5 is a block diagram illustrating the structure of the echo canceler shown in FIG. 3.

Reference is now made to FIG. 5, which illustrates the structure of the echo canceler 180, showing both FIR filtering and coefficient adaptation. Like the decimator 120 of FIG. 4, the echo canceler 180 includes a plurality of delay elements 320, 322, 324, 326, 328, 330, and 332. It further includes a plurality of adders 340, 342, 344, and 346, and multipliers 350, 352, 354, 356, 358, 360, 362, and 364. The output of multipliers 358, 360, 362, and 364 are summed and output as an echo replica, which is subtracted from the output of decimator 120.

The echo canceler 180 includes an input signal 114, which is received from the decimator 110 (see FIG. 3), and an output signal 132, which is directed to adder 130 (FIG. 3). It also includes an adaptation signal 138, which is denoted as "residual". The detailed operation of the echo canceler 180 need not be described in detail herein, as it will be appreciated by persons skilled in the art. Suffice it to say that the echo canceler 180 operates by replicating the echo signal internally and subtracting it from the received signal (by adder 130). The echo replica is produced by filtering the reference signal, where the output of the decimator 110 bridges between the transmit signal and the echo canceler in FIG. 3, through an FIR filter that learns the echo path using a least mean square (LMS) error algorithm.

In the preferred embodiment, the 84-tap echo canceler operates at 552,000 samples per second. In each sample period, one new reference sample d[n] enters the FIR filter, and one replica sample y[n] is generated according to the equation:

$$y[n] = \sum_{k=0}^{83} d[n-k]a_k \quad \text{Equation 2}$$

where $a_k$ is the echo canceler coefficient. The echo canceler learns the echo path by adapting the coefficients according to the equation:

$$a_k^{[n+1]} = a_k^{[n]} + \beta \cdot e[n] \cdot d[n-k], \text{for } k=0,1,\ldots 83 \quad \text{Equation 3}$$

where $a_k^{[n]}$ indicates the value of coefficient $a_k$ at sample time n, β is the step size (which controls the rate at which the echo canceler adapts), and e[n] is the echo residual which is the difference between the received signal and echo replica y[n].

As will be appreciated from the foregoing discussion, various advantages are achieved by the system of the present invention. For example, the inventive system saves memory space required for echo cancellation, since the number of coefficients had been reduced to a fraction of the original number, as practiced by prior art systems. The invention, accordingly, saves computations (and therefore time), since the sampling frequency has been reduced to a fraction of the original, as practiced by prior art systems. The savings of memory and computations translate into saving in power consumption that is another essential consideration in ADSL applications. The system requires the same coverage of the echo path by the echo canceler 180, since the two low pass decimation filters are identical. In addition, the echo cancellation is achieved entirely in the time domain, thereby untangling the echo canceler from the equalizer and eliminating the necessity of symbol synchronization as required in the hybrid time and frequency domain approach.

The foregoing description has been presented for purposes of illustration and description. It is not intended to be exhaustive or to limit the invention to the precise forms disclosed. Obvious modifications or variations are possible in light of the above teachings. For example, rather than two times oversampling the received signal, the receive path 104 may be sampled at 276 kilo samples per second, and eight to one decimator circuits may be implemented, instead of four to one.

The embodiment or embodiments discussed were chosen and described to provide the best illustration of the principles of the invention and its practical application to thereby enable one of ordinary skill in the art to utilize the invention in various embodiments and with various modifications as are suited to the particular use contemplated.

What is claimed is:

1. A central office modem including logic for echo cancellation over an asymmetric transmission and receiving spectra, comprising:

a transmit path for communicating data within a first bandwidth;

a receive path for communicating data within a second bandwidth;

a first decimator disposed in communication with the transmit path of the central office modem, whereby said first decimator filters an incoming signal having a first sampling rate on said transmit path and emits a signal output at a reduced sampling rate;

an adaptive echo canceler responsive to a time domain output from said first decimator and operative to generate an output comprising an echo replica estimation of an echo signal leaking from said transmit path to said receive path;

a second decimator disposed along said receive path whereby said second decimator filters an incoming signal having a second sampling rate on said receive path to emit a signal output at a reduced sampling rate;

an adder configured to subtract the output of said adaptive echo canceler from the output of said second decimator.

2. The central office modem including logic for echo cancellation as recited in claim 1, wherein said adaptive echo canceler includes a finite impulse response filter employing a least mean square error algorithm.

3. The central office modem including logic for echo cancellation as recited in claim 2, further comprising an adaptive echo canceler input rate at about 552,000 samples per second.

4. The central office modem including logic for echo cancellation as recited in claim 1, wherein said first decimator and said second decimator have an approximately identical impulse response.

5. The central office modem including logic for echo cancellation as recited in claim 1, wherein said first decimator and said second decimator are decimation finite impulse response low pass filters.

6. The central office modem including logic for echo cancellation as recited in claim 5, wherein said first decimator and said second decimator include a 4 to 1 ratio of input samples to output samples.

7. The central office modem including logic for echo cancellation as recited in claim 6, wherein said first decimator and said second decimator include a substantially flat response from about 0–138 KHz and provide about a 100+ dB suppression beyond about 276 KHz.

8. The central office modem including logic for echo cancellation as recited in claim 5, wherein said first decimator and said second decimator include a continuous average of a series of 4 input samples to create a single output sample.

9. The central office modem including logic for echo cancellation as recited in claim 5, wherein the structure of said first decimator and said second decimator is a decimation delay-line implementation.

10. The central office modem including logic for echo cancellation as recited in claim 1, wherein the adaptive echo canceler further comprises a means for learning an echo path to produce said echo replica from a reference signal.

11. The central office modem including logic for echo cancellation as recited in claim 1, wherein said adaptive echo canceler, said first decimator, and said second decimator operate only in the time domain.

12. A central office modem including logic for echo cancellation over an asymmetric transmission and receiving spectra, comprising:

a first decimator operative to receive a reference signal at a high sampling rate and output a reference signal at a reduced sampling rate;

an adaptive echo canceler responsive to the output of said first decimator whereby an echo replica is generated;

a second decimator operative to generate a reduced sampled received signal from a higher sampled signal for interaction with the output from said adaptive echo canceler; and an adder responsive to the outputs of both said adaptive echo canceler and said second decimator wherein said echo replica is subtracted to produce a cancellation error signal.

13. An apparatus for echo cancellation over an asymmetric transmission and receiving spectra as recited in claim 12, wherein said first decimator and said second decimator have an approximately identical transfer function.

14. The central office modem including logic for echo cancellation over an asymmetric transmission and receiving spectra as recited in claim 12, further comprising:

a transmit path for transmitting signals at a sampling rate of about 2,208,000 samples per second;

a receive path for receiving signals at a sampling rate of about 552,000 samples per second;

a feedback path extending between said receive path and said adaptive echo canceler to permit said echo replica to adapt to an actual echo signal present in said spectra.

15. A method for echo cancellation over an asymmetric transmission and receiving spectra, comprising the steps of:

extending a transmission reference path between a transmit path of a central office modem and a receive path of a central office modem;

disposing a first decimator along said transmission reference path where by said first decimator filters a signal with an incoming sampling rate on said transmit path and emits a time domain output at a reduced sampling rate;

generating an echo replica estimation of an echo signal leaking from said transmit path to said receive path by an adaptive echo canceler that is responsive to said time domain output from said first decimator;

disposing a second decimator along said transmission reference path whereby said second decimator filters a signal with an incoming sampling rate on said receive path and emits a time domain output at a reduced sampling rate; and subtracting the echo replica estimation from the output of said second decimator to produce a cancellation error signal on said receive path.

16. The method for echo cancellation as recited in claim 15, further comprising the step of performing a least mean square error algorithm in said adaptive echo canceler which is a finite impulse response filter.

17. The method for echo cancellation as recited in claim 16, further comprising the step of setting the input rate of said adaptive echo canceler at about 552,000 samples per second.

18. The method for echo cancellation as recited in claim 15, further comprising the step of making said first decimator and said second decimator identical decimation finite impulse response low pass filters.

19. The method for echo cancellation as recited in claim 18, further comprising the step of implementing said first decimator and said second decimator with a 4 to 1 ratio of input-samples to output samples.

20. The method for echo cancellation as recited in claim 19, further comprising the step of setting said first decimator and said second decimator to have a substantially flat response from about 0–138 KHz and provide about a 100+ dB suppression beyond about 276 KHz.

21. The method for echo cancellation as recited in claim 18, further comprising the step of continuously averaging a series of 4 input signals to create a single output signal from said first decimator and a single output signal from said second decimator.

22. The method for echo cancellation as recited in claim 18, further comprising the step of making the structure of said first decimator and said second decimator a decimation delay-line implementation.

23. The method for echo cancellation as recited in claim 15, further comprising the step of operating said adaptive echo canceler, said first decimator, and said second decimator only in the time domain.

* * * * *

UNITED STATES PATENT AND TRADEMARK OFFICE
CERTIFICATE OF CORRECTION

PATENT NO. : 6,421,377 B1  Page 1 of 1
DATED : July 16, 2002
INVENTOR(S) : Langberg et al.

It is certified that error appears in the above-identified patent and that said Letters Patent is hereby corrected as shown below:

Column 5,
Line 19, after "around," delete "½T" and replace with $\frac{1}{2T}$.

Line 23, after "at", delete "½T" and replace with $\frac{1}{2T'}$.

Column 8,
Line 10, after "equation," remove the underline from the equation.

In Figure 7, insert the graph, as shown in the accompanying FIG. 7 (below).

FIG. 7

Signed and Sealed this

Nineteenth Day of November, 2002

Attest:

JAMES E. ROGAN
Attesting Officer   Director of the United States Patent and Trademark Office